Sept. 17, 1940.  E. J. PILBLAD ET AL  2,214,776

LOCKING DEVICE

Filed Jan. 13, 1938

Fig. 4   BY

INVENTOR.
Eric J. Pilblad
Charles C. Strange
F. Bascom Smith
ATTORNEY.

Patented Sept. 17, 1940

2,214,776

UNITED STATES PATENT OFFICE 2,214,776

LOCKING DEVICE

Eric J. Pilblad, Rockville Centre, and Charles C. Strange, Port Richmond, Staten Island, N. Y.

Application January 13, 1938, Serial No. 184,794

9 Claims. (Cl. 192—13)

This invention relates to locking devices and more particularly to apparatus whereby the locking and releasing of one movable member may be controlled by a second member which is movable relative to said first member.

One of the objects of the invention is to provide novel apparatus for engaging and holding the brake mechanism of a motor vehicle in applied position.

Another object of the present invention is to provide novel means whereby movement of the clutch mechanism will control the operation of the above holding means.

A further object of the invention is to provide a locking device equipped with novel, readily accessible adjusting means for accurately predetermining at what positions of the clutch mechanism the novel brake locking apparatus will be rendered operative and inoperative.

A still further object is to combine, in a novel manner, apparatus of the above character with fluid pressure operated brakes.

Another object of the invention is to provide a novel brake holding mechanism for vehicles that is simple construction, easily installed and adaptable to large scale production at low cost.

Still another object of this invention is to provide novel locking means for holding a brake mechanism, which means are compact, occupy only a small space and comprise only a small number of parts.

A still further object is the provision of novel apparatus of the above type which is adaptable for mounting and use in a motor vehicle without material alteration of the brake or clutch structure.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference being primarily had for this latter purpose to the appended claims.

In the drawing, wherein like reference characters refer to like parts throughout the several views, Fig. 1 is a somewhat diagrammatic top plan view of one embodiment of the present invention as applied to a motor vehicle with vacuum operated brakes;

Figure 1:
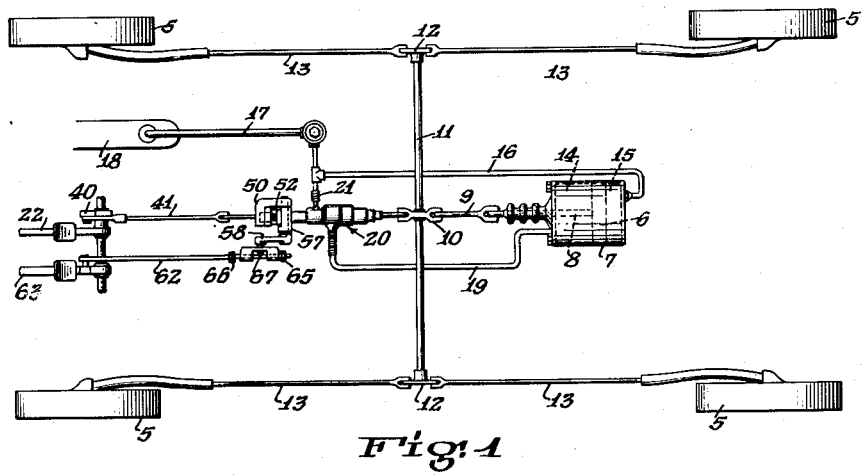

In general, the embodiments of the invention illustrated in the drawing, by way of example, comprise means for holding the vacuum power actuated brake mechanism of an automotive vehicle in applied position, said means being adapted to be rendered operative to hold the brakes in applied position only at the will of the driver and being so constructed as to not interfere in any way whatever with the normal or emergency application of the brakes. The locking means is preferably controlled by an element of the clutch mechanism in such a manner that an additional movement to that ordinarily employed in actuating the clutch is required to render said locking means operative. The release of the locking means, and hence release of the brakes, is accomplished by the engaging movement of the clutch mechanism, it being possible, if desired, to time the brake release in any suitable manner with respect to the actual engagement of the clutch driving surfaces. It is usually desirable to release the brakes at substantially the same instant that the clutch plates or driving surfaces of the vehicle clutch mechanism engage and thereby prevent any backward rolling of the vehicle when starting up an incline.

In the illustrated embodiments, the present invention is shown, by way of example, in combination with a conventional vacuum operated brake system of a motor vehicle, which system comprises the usual brakes 5 adapted to be associated with the wheels (not shown) of the vehicle for frictionally arresting the motion of the wheels to stop the vehicle and hold the same against movement when said brakes are applied.

In the particular embodiment illustrated in Fig. 1, the force which applies the brakes is produced by a pressure actuated piston 6 reciprocable within power cylinder 7 in accordance with pressure changes therein, and said piston is connected through the usual mechanical means comprising rods and levers to said brakes. As diagrammatically shown, said mechanical means comprises piston rod 8, suitably secured to an element or rod 9 which, in turn, is pivotally connected to a lever 10. Lever 10 is rigidly fixed intermediate its ends to a shaft 11 and is adapted to transmit its rotary motion to said shaft. A lever 12, similar to lever 10, is rigidly fixed to each end of shaft 11 and rotates as a unit with said shaft. Pivotally secured to the ends of levers 12 are rods 13, each of which is, in turn, operatively connected to one of the brakes 5 so as to apply thereto the force exerted by piston 6. Normally, the brakes are held inoperative by the usual resilient means (not shown), since the pressure differential between the respective faces of piston 6, i. e., between the two opposing chambers 14 and 15 formed by the faces of piston 6 and the internal walls of cylinder 7, is normally insufficient to overcome the forces opposing the piston motion. The right-hand chamber 15 is directly connected by suitable means, such as conduits 16 and 17, to a source of sub-atmospheric pressure which, as shown, is intake manifold 18. Chamber 14, on the other hand, is connected by means of a conduit 19 to a floating valve mechanism 20, to be hereinafter more fully described, and through said valve mechanism to a second conduit 21 and then to the source of sub-atmospheric pressure, thereby permitting chamber 14 to be shut off from intake manifold 18 by suitable operation of said valve mechanism. By shutting off chamber 14 from the intake manifold and admitting atmospheric air into said chamber, a pressure differential is set up between chambers 14 and 15 which is sufficient to move piston 6 and apply brakes 5. In order to permit the floating movement of valve mechanism 20, conduits 19 and 21 or parts thereof, preferably those portions immediately adjacent said valve mechanism, are flexible.

Since it is desirable that the brakes be applied in proportion to the displacement of the brake pedal, valve mechanism 20 is suitably constructed to admit atmospheric air into chamber 14 of cylinder 7 in quantities proportional to the displacement of brake pedal 22.

Figure 2:
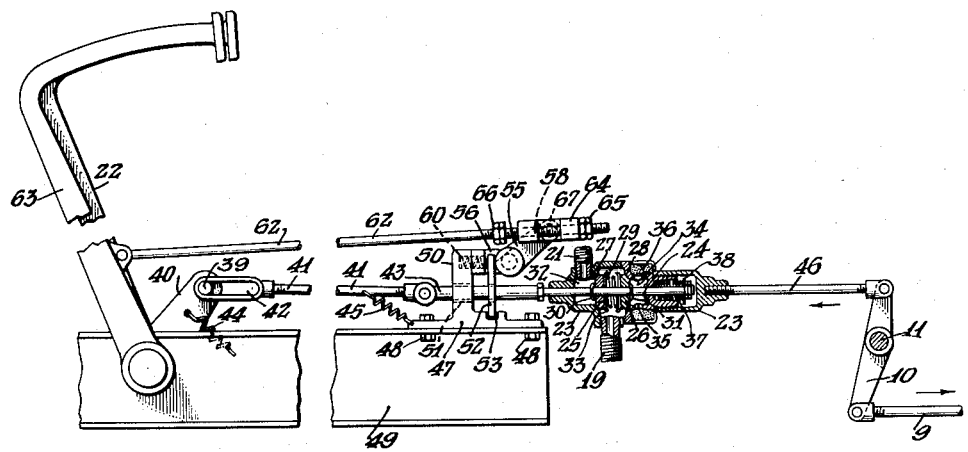
Fig. 2 is an enlarged side elevation, partly in section and with parts broken away, showing a control valve of the braking system in combination with the locking mechanism.

In the embodiment illustrated in Fig. 2, valve mechanism 20 is of the floating type adapted for motion relative to the fixed parts of the motor vehicle, and comprises a casing 23 and a valve rod 24 mounted for reciprocation with said casing. Two valves 25 and 26 are slidably mounted on valve rod 24 so as to be free for movement relative thereto and, as shown, are adapted to engage two seats 27 and 28 formed in casing 23 to make an air-tight seal therewith. A compressed coil spring 29 surrounds rod 24 and is positioned between valve 25 and 26 tending to keep them separated and in engagement with their respective valve seats.

Suitable means, in the form of brackets 30 and 31 fixed to valve rod 24, are provided for limiting the movement of said valve rod relative to valves 25 and 26 and for causing said valve rod to move said valves from seats 27 and 28. When valves 25 and 26 engage seats 27 and 28, the interior of casing 23 is divided into three separate chambers, chamber 32 communicating through conduit 21 with the sub-atmospheric pressure source, chamber 33 communicating through conduit 19 with chamber 14 of cylinder 7, and chamber 34, which is always open to the atmosphere through outlets 35 and an air filter 36. A compressed coil spring 37 is preferably interposed between a bracket 38 suitably fixed to or integral with valve rod 24, and casing 27, and tends to move said valve rod to unseat valve 25 from shoulder 27 and open chamber 33 to sub-atmospheric pressure and thereby equalize the pressures within chambers 14 and 15 of the cylinder 7.

Movement of valve rod 24 is produced by brake pedal 22 which is preferably connected to said valve rod by a lost-motion connection comprising a pin 39 rigidly fixed to arm 40 of brake pedal 22 and a link 41 having one end provided with an elongated slot 42. Slot 42 cooperates with pin 39 to permit relative movement of said pedal with respect to said rod and the rest of the brake mechanism. Link 41 is pivotally connected to a second link or rod 43 and said rod may be integral with or attached in any suitable way to valve rod 24 of valve mechanism 20. Accordingly, the brake pedal when depressed, i. e., displaced in a counter-clockwise direction, will cause the valve rod 24 to move therewith. However, the return motion of said pedal to normal position may take place irrespective of whether valve rod 24 moves therewith or not, because of the above-described lost motion connection. In the illustrated embodiment, a coil spring 44 is connected from the vehicle chassis to arm 40 and tends to move brake pedal 22 in a clockwise direction to normal inoperative position. A second coil spring 45 is preferably connected from the rod 41 to the chassis and tends to move the valve rod 24 to the right to unseat valve 25 and equalize the pressures in power cylinder 7.

In order to control the fluid flow into power cylinder 7, valve casing 23 is adapted for movement relative to valve rod 24 by being suitably linked by rod 46 to the connecting linkage which transmits the motion of the vacuum actuated piston 6 to the brakes 5, said rod being threadedly secured at one end to said casing and at the other end to the upper end of lever 10.

Thus, when the brake pedal 22 is depressed by the operator from its normal inoperative position, overcoming the combined resistances of coil springs 44 and 45 fixed to the chassis and coil springs 29 and 37 within the valve mechanism 20, valve rod 24 is moved to the left with respect to casing 23. Movement of valve rod 24 to the left causes bracket 31 to bear against valve 26 moving the same from its seat 28 and thereby opening chamber 33 to chamber 34 and allowing air at atmospheric pressure to flow through said chambers into conduit 19 and chamber 14. The increased pressure within chamber 14 causes piston 6 to move to the right and accordingly apply the brakes. The piston movement and the degree of brake application is limited by the magnitude of the pedal displacement due to the floating action of valve casing 23, since, as soon as piston 6 moves to the right, the valve mechanism casing is set into motion in the opposite direction through the connection including lever 10 and line 46. This motion of valve casing 23 continues until the casing has moved a sufficient distance to reseat the valve 26 at which time the flow of atmospheric air into chamber 14 is shut off and piston 6 ceases moving and stops the movement of the casing. The movement of piston 6 is thus dependent upon the movement of brake pedal 22 so that the brakes are applied in proportion to the brake pedal displacement. Furthermore, for any additional displacement of brake pedal 22 and valve rod 24, piston 6 will move a proportional distance and the application of the brakes will be proportionately increased. As a result of this arrangement, the only resistances to be overcome by the motor vehicle operator in applying the brakes are the resistances of the coil springs 44, 45, 29 and 37, and the actual braking force is applied by power unit 6, 7 under the control of the operator through brake pedal 22.

When the brake pedal is released, valve rod 24 moves to the right due to the compressive force of spring 45 and the expansive force of spring 37 and thereby causes bracket 30 to bear against valve 25 and move said valve from its seat so as to open chamber 32 to chamber 33. Chamber 14 is thus connected to the sub-atmospheric pressure source 18 and air flows from said chamber equalizing the pressure within cylinder 7 and permitting piston 6 to move to the left under the action of the conventional brake-releasing springs. Casing 23 is again moved with piston 6 and reseats open valve 25 so that the extent to which the brakes will be released will depend on the extent to which brake pedal 22 has been allowed to move toward its normal position. Therefore, the application and release of the brakes will always be directly under the control of the motor vehicle operator in accordance with his operation of the brake pedal and to hold the brakes in applied position, it is only necessary after application thereof to restrain valve rod 24 from movement to the right. Furthermore, holding valve rod 24 against movement to the right does not affect the return of brake pedal 22 to its normal position due to the lost motion connection through which said pedal operates said valve.

Since it is often desirable, as when starting a motor vehicle up an incline, that the motor vehicle operator have his right foot free for operation of the accelerator pedal and since, in such instances, the brakes must be held until the moment of clutch plate engagement, novel means, operable only at the will of the driver, are provided for the purpose of holding the brake mechanism of a motor vehicle during clutch disengagement and for releasing said brake mechanism at the moment of clutch plate engagement. Said novel means comprise means for holding valve rod 24 against longitudinal movement along its axis in a direction which will release the brakes after application thereof. The novel locking means, in the form shown in Fig. 2, comprises a frame or supporting member 47 secured by any suitable means, such as bolts 48, to the chassis 49 of the motor vehicle. A lug or arm 50 integral with said frame and extending upwardly therefrom, has an opening 51 provided therein for slidably receiving rod 43, said opening being of a somewhat greater diameter than the diameter of said rod to permit the free reciprocal movement of the latter. A rectangular locking plate 52 is mounted in a groove 53 in the base of the supporting member 47 so as to be free for pivotal movement relative thereto and extends upwardly from said frame. An opening 54 of a slightly greater diameter than the diameter of rod 43 is bored in said plate and said rod extends through said opening. Normally, the plane of the plate 52 is perpendicular to the axis of the rod 43 and the opening 54 in said plate is concentric with the periphery of rod 43, thus permitting free movement of said rod with respect to said plate.

Figure 3:
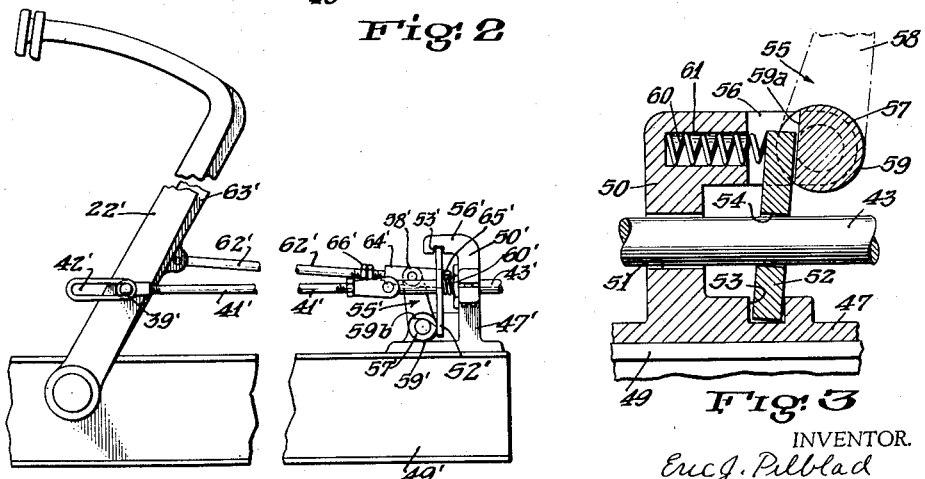
Fig. 3 is an enlarged side elevation, sectional view taken through the locking device and showing the locking member in locking position; and, Fig. 4 is a side elevation, with parts broken away, of a second embodiment of the invention.

In order to lock rod 43 against longitudinal movement in a direction to release the brakes, the locking plate 52 is angularly displaced relative to the longitudinal axis of said rod, as shown in Fig. 3, so that the edges of the opening 54 frictionally engage the periphery of rod 43 and prevent movement thereof in the direction of displacement of said plate. Since the direction of displacement of the plate is the direction in which said rod must move to release the brakes, the latter are held against such release. This frictional resistance to motion produced upon engagement of rod 43 with plate 52 will be augmented by any slight motion or tendency for motion of the rod in the direction of displacement of said plate, thereby increasing the force that is preventing the movement of the brakes into inoperative position. However, any movement of said rod in the opposite direction, i. e., in the direction from which locking plate 52 has been displaced, tends to return said plate to its inoperative position and to release the pressure of said plate on said rod permitting free movement thereof in the direction of increased application of the brakes. The uni-directional locking engagement between rod 43 and plate 52 is important in motor vehicle operation in that, though the brakes may be held in operative position by the locking mechanism, the motor vehicle operator is never prevented from a further application thereof.

To control the operation of the above-described brake holding means, novel means are provided for permitting the displacement of locking plate 52 into engagement with rod 43, to hold the brakes in applied position, said novel means, as shown in the illustrated embodiment, comprising a pivotal member 55 suitably journalled for rotation in laterally extending portion 56 of arm 50. Said pivotal member consists of a horizontally disposed shaft 57 which extends a distance approximately the width of the locking plate from the face of portion 56 of arm 50 and a radially extending arm or lever 58 at the end of said shaft 57. Locking plate 52 extends upwardly between shaft 57 and arm 50 of supporting member 47 and the relative positioning of the parts is such that, when plate 52 bears upon the cylindrical surface 59 of shaft 57, said plate is perpendicular to the axis of rod 43. Suitable means in the form of a compressed coil spring 60 recessed in an opening 61 in arm 50 is provided for bearing against plate 52 and tending to pivotally displace the latter into locking engagement with rod 43 to hold the brakes against release. Normally, the action of spring 60 merely maintains plate 52 in contact with the cylindrical surface 59 of shaft 57, said plate remaining disengaged from rod 43, as shown in Fig. 2. However, a portion of the shaft 57 is preferably machined to produce a cross-section through said shaft that comprises a circle with a segment thereof cut away, thus providing a plane surface 59a, the distance of which from the center of rotation of shaft 57 is less than the distance of said center from the cylindrical or arcuate surface 59. As a result, when member 55 is rotated to bring said plane surface adjacent to the plate 52, the decreased radial distance of said surface from the center of rotation permits spring 60 to pivot plate 52 about its lower edge as an axis and into locking engagement with rod 43, as shown in Fig. 3.

Since it is desirable to have the brakes locked in applied position by the clutch mechanism during the disengaging movement thereof and released from applied position during the engaging movement thereof, means are provided for connecting an element of the clutch mechanism to pivotal member 55 to control the rotation of said member, thereby controlling the locking engagement of plate 52 with rod 43. Said connecting means are of the lost motion type and comprise, as shown, a rod 62 pivotally secured at one end to clutch pedal 63, and a sleeve 64 slidably mounted on said rod at the other end thereof for relative movement thereto, which movement is limited by nuts 65 and 66 threadedly secured on rod 62 and adapted to engage sleeve 64 and move the same with said rod. Sleeve 64 is secured by a suitable pivotal connection, such as pin 67 to the outer end of arm 58 so that movement of said sleeve will rotate shaft 57 and actuate locking plate 52. The lost motion connection produced by spacing nuts 65 and 66 a greater distance apart than the length of sleeve 64 causes the locking plate to be rendered operative at one position of the clutch mechanism during disengaging movement thereof and to be rendered inoperative at some other position of the clutch mechanism during the engaging movement thereof. By proper adjustment of the nuts 65 and 66, the brakes are locked in applied position substantially after clutch plate disengagement and released at the point of clutch plate engagement.

In operation, when the clutch pedal is depressed after the brakes have been applied, rod 62 moves to the left and at the beginning of the motion slips through sleeve 64 which remains motionless until nut 65 engages the right end thereof. Sleeve 64 then moves with rod 62 and rotates arm 58 until plane surface 59a of shaft 57 is adjacent to locking plate 52 permitting the displacement of said plate by spring 60 into engagement with rod 43 to hold the brakes in applied position. When this is accomplished, the clutch mechanism is well past disengaged position, the clutch plates having been disengaged without affecting the holding mechanism. While the brake mechanism is thus held operative, by the gripping action of locking plate 52 upon rod 43, brake pedal 22 may be released by the motor vehicle operator and returned to normal position due to the lost motion connection including pin 39 and slot 42. To release the brakes, the clutch mechanism is moved toward engaged position, rod 62 thereby being moved to the right and after a predetermined lag the left end of sleeve 64 is engaged by nut 66 thereupon rotating arm 58 and disengaging locking plate 52. The lost motion is preferably arranged to delay the moment of brake release until the clutch plates are about to be engaged.

A second embodiment of the invention is illustrated in Fig. 4, wherein the brake and clutch pedals are shown in released position and are disposed in such a manner as to have clockwise movement thereof disengage the clutch mechanism and render the brakes operative. However, the embodiment operates in a similar manner and comprises similar parts to the first-described embodiment and, therefore, primed numerals are employed to designate the parts which are similar to the above-described parts designated by the same numeral. In the form illustrated, the brake mechanism is controlled by operation of a brake pedal 22' and an element 43' which is a part of the brake mechanism is adapted for free reciprocation through an opening in an upwardly extending arm 50' of a supporting member 47' in response to operation of said brake pedal. Element 43' may be the valve rod of a vacuum power braking system, the piston rod of a hydraulic braking system, or a member for transmitting the pressure to a direct acting mechanical system, and in all instances after pedal 22' has been depressed to apply the brakes and the motion thereof transmitted to element 43', holding said element against movement maintains said brakes in applied position.

A locking plate 52' mounted for free pivotal movement in a groove 53' in a horizontally extending portion 56' of arm 50' is provided for holding element 43' against movement in the direction to release the brake mechanism. Normally said locking plate is supported in said groove by rod 43', which extends through an opening in said plate. Resilient means in the form of a coil spring 60' which surrounds element 43' of the brake mechanism and which is interposed between arm 50' of the supporting member 47' and said locking plate tends at all times to displace said plate into locking engagement with element 43'. Said plate is held in disengaged position by pivotal member 55' suitably journalled in the base of support 47', when the cylindrical portion of shaft 57' which is a part of said member bears against said plate and resists the force of spring 60'. However, when the shaft is rotated sufficiently to bring plane surfaces 59b of said shaft into a position adjacent to plate 52', said plate is free for pivotal movement in the direction of said plane surfaces and the displacement of said plate in that direction by spring 60' causes element 43' to be held against movement by the frictional force exerted thereon by the wall of the opening in said plate which engages the periphery of said element.

To rotate shaft 57' and thereby control the operation of locking plate 52', an arm 58' which is a part of pivotal member 55' is suitably connected to the clutch pedal 63'. The connection between arm 58' and clutch pedal 63' comprises a sleeve 64' pivotally secured to said arm and a rod 62' which is similarly secured to said clutch pedal and on which said sleeve is slidably mounted. Nuts 65' and 66' threadedly fixed to rod 62' on each side of sleeve 64' are adapted to engage said sleeve and move the same with rod 62' when so engaged. Suitable spacing of said nuts produces a lost motion connection between arm 58' and rod 62' which controls the rotation of shaft 57' so as to lock element 43' against movement at some position of the clutch mechanism which is past the point at which the clutch plates disengage and to release said element when the clutch mechanism has in its engaging movement reached the point at which driving engagement of the clutch plates takes place.

There is thus provided a novel means for locking the brakes of a motor vehicle in applied position by the depression of the clutch pedal past the position at which the clutch plates disengage. An additional movement of the clutch pedal past the position of clutch plate disengagement is therefore necessary for the actuation of the locking means, making the use thereof optional with the motor vehicle operator and in no way affecting the normal and usual operation of the clutch and brake mechanisms when the operator chooses not to employ said locking means. There is also provided a novel locking means and control therefor whereby the release of said locking means after application thereof may be effected by the clutch mechanism during the engaging movement of said clutch mechanism at substantially the moment of clutch plate engagement. Said novel locking device is of extremely simple and inexpensive construction and may be quickly installed and correctly adjusted for use on any motor vehicle braking system.

Although only two specific embodiments of the invention have been illustrated and described in detail, it is to be expressly understood that the same is not limited thereto but that various

What is claimed is:

1. In combination, a brake, a brake pedal vacuum power means for applying said brake, a valve controlling the fluid flow into said power means, a valve rod for transmitting the movement of said brake pedal to said valve, and locking means for engaging said valve rod to hold the same against movement in at least one direction.

2. In combination with a brake and a clutch mechanism, vacuum power means for applying said brake, valve means for controlling said power means, pivotal locking means for engaging an element of said valve means to hold the same against movement in one direction so as to maintain said brake in applied position, and other pivotal means associated with said clutch mechanism for moving said locking means out of engagement with said valve element.

3. In combination, a clutch mechanism, a brake, fluid pressure power means for applying said brake, a floating valve mechanism operatively connected to said power means and controlling the fluid pressure therein, means for engaging an element of said valve mechanism for holding the same against movement in at least one direction to hold the brake in applied position, and means controlled by the clutch mechanism for actuating said holding means.

4. In a motor vehicle having a brake and clutch mechanism, a valve mechanism controlling the operation of said brake, locking means adapted to engage an element of said valve mechanism for locking the same against movement in at least one direction to hold said brake in applied position, resilient means adapted to move said locking means into engagement with said element, and pivotal means adapted to be operated by said clutch mechanism normally keeping said locking means out of engagement with said element.

5. In a motor vehicle having a brake and a clutch mechanism, fluid operated power means for applying said brake, valve means for controlling the fluid pressure in said power means, means for engaging an element of said valve means to maintain said brake in applied position, and means operatively connected to said clutch mechanism adapted to release said holding means at substantially the point of clutch plate engagement.

6. The combination with a brake and clutch mechanism of a motor vehicle, of an element movable with the brake mechanism, a member adapted to lock said element against movement in at least one direction to hold the brake mechanism in applied position, resilient means for holding said member in locking position, a rod adapted to be actuated by the clutch mechanism, a sleeve slidably mounted on said rod, means on said rod for limiting the sliding movement of said sleeve in both directions, a pivotally mounted cam for moving said locking member to inoperative position, and means pivotally connecting said sleeve and said cam whereby said locking member may be controlled by said clutch mechanism.

7. In combination, a brake, a clutch mechanism, fluid pressure power means for applying said brake, valve means for controlling said power means, means for holding an element of said valve means against movement in one direction to prevent fluid flow through said power means after application of the brake, and means associated with said clutch mechanism for controlling the operation of said holding means including a member operable by said clutch mechanism, an element slidably mounted on said member, means for limiting the relative movement of said member and element, a pivoted lever adapted to engage said holding means to move the latter to inoperative position and means for pivotally connecting said member and lever.

8. The combination with the brake and clutch mechanisms of a motor vehicle, of locking means for holding said brake mechanism in applied position, and means associated with said clutch mechanism for actuating said locking means including a member operable by said clutch mechanism, an element slidably mounted on said member, means for limiting the relative movement of said member and element, a pivoted lever adapted to engage said holding means to move the latter to inoperative position and means for pivotally connecting said member and lever.

9. The combination with the brake and clutch mechanisms of a motor vehicle, of means for frictionally locking said brake mechanism in applied position, resilient means for normally holding said locking means in operative position, and means controlled by said clutch mechanism for moving said locking means to inoperative position, said third-named means including a member operable by the clutch mechanism, an element slidably mounted on said member for limited movement relative thereto and pivoted means operable by said element and adapted to engage said locking means to move said locking means to inoperative position.

ERIC J. PILBLAD.
CHARLES C. STRANGE.